C. N. MORGAN.
AUTOMATIC OILING DEVICE FOR VEHICLE WHEELS.
APPLICATION FILED NOV. 23, 1917.
1,297,717.
Patented Mar. 18, 1919.
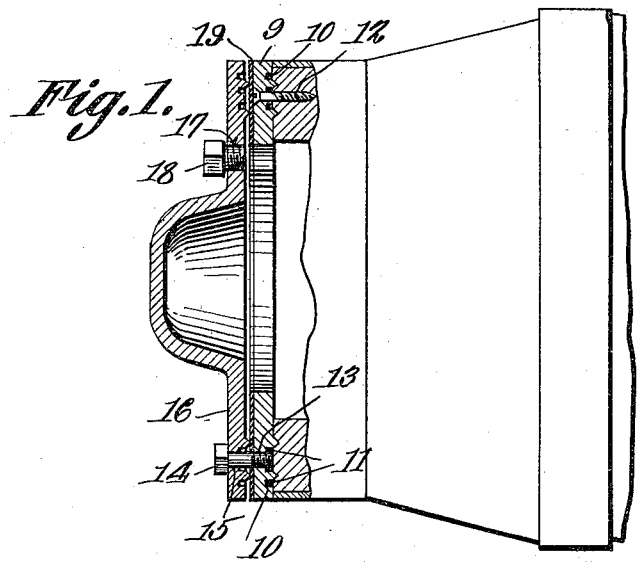
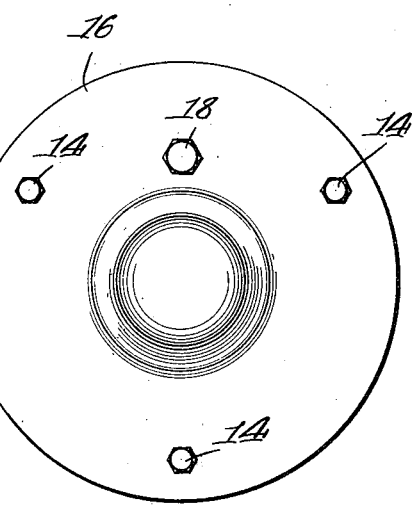
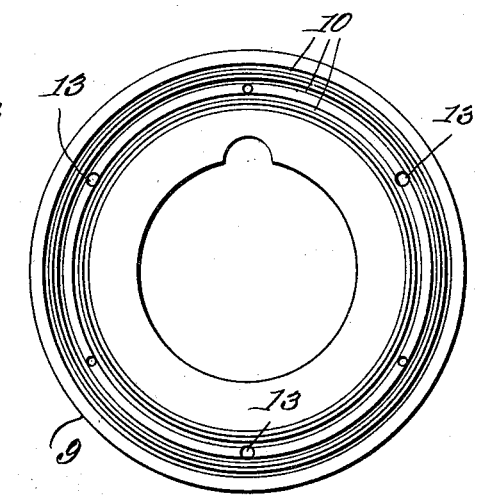
Fig. 2.
Fig. 3.
Inventor,
Charles Nelson Morgan
Attorney

UNITED STATES PATENT OFFICE.

CHARLES NELSON MORGAN, OF HILDRETH, NEBRASKA.

AUTOMATIC OILING DEVICE FOR VEHICLE-WHEELS.

1,297,717.

Specification of Letters Patent.

Patented Mar. 18, 1919.

Application filed November 23, 1917. Serial No. 203,644.

*To all whom it may concern:*

Be it known that I, CHARLES NELSON MORGAN, a citizen of the United States of America, and resident of Hildreth, in the county of Franklin and State of Nebraska, have invented certain new and useful Improvements in Automatic Oiling Devices for Vehicle-Wheels, of which the following is a specification.

This invention relates to hub caps for vehicles and particularly for wagons, carriages and the like.

An object of this invention is to provide an automatic oiling device for the purpose of oiling wheels, particularly wagon wheels, without removing the nut or wheel from the spindle. In carrying out the invention, the device is attached to the outer end of the wheel hub in such a manner that the oil which it contains works between the hub and axle by end movement of the hub.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a fragment of a hub of a wheel, part of the said hub and boxing as well as the cap being in section;

Fig. 2 illustrates an end view thereof; and

Fig. 3 illustrates a view of the inner face of the ring.

I employ as shown in this embodiment of the invention, an annular ring 9 having its inner surface provided with annular recesses 10 for the reception of packing 11 which is intended to bear against the end of the hub to make a leak-proof joint therewith. The ring is held in place, as shown, by screws 12 extending through the said ring and embedded in the hub.

The ring has a plurality of threaded apertures 13 to receive the screws 14, the said screws extending through the apertures 15 in the face plate 16 whereby the said face plate is held on the ring, though it may be detached readily by the removal of the screws.

In the present form of the invention, the face plate has a port or opening 17, the wall of which is threaded to receive a screw plug 18 so that by the removal of the plug, lubricant can be delivered to the space in the hub which is back of the said plate, thus making it possible to lubricate the bearings of the wheel expeditiously without removing either the nut or wheel from the spindle.

A gasket 19 is interposed between the annular ring 9 and the face plate 16. As stated, the device may be applied to buggy wheels and wagon wheels now in common use by applying the same to the face of the hub, through the provision of means described.

I claim:

1. In a vehicle wheel, a hub, a ring having an annular recess in its inner face, packing in said recess, means for securing the ring to the hub, said ring having apertures therein, a face plate having apertures therein registering with the apertures in the ring, members passing through said plate and anchored in the ring for holding the plate in place, said face plate having a port therein, and a plug for closing the port.

2. In a vehicle wheel, in combination with a hub, a ring secured to the end of the hub, packing interposed between the end of the hub and the ring, a face plate, packing interposed between the face plate and the ring, and means for the admission of lubricant to the journal without removing the wheel from the axle.

3. In a vehicle wheel, the combination with a hub, of a leak proof member secured to the end of the hub, a leak-proof face plate removably secured to said leak-proof member, said face plate having a port, the port having a removable plug for the admission of lubricant to the bearings without removing the wheel.

CHARLES NELSON MORGAN.

Copies of this patent may be obtained for five cents each, by addressing the "Commissioner of Patents, Washington, D. C."